Figure 1:
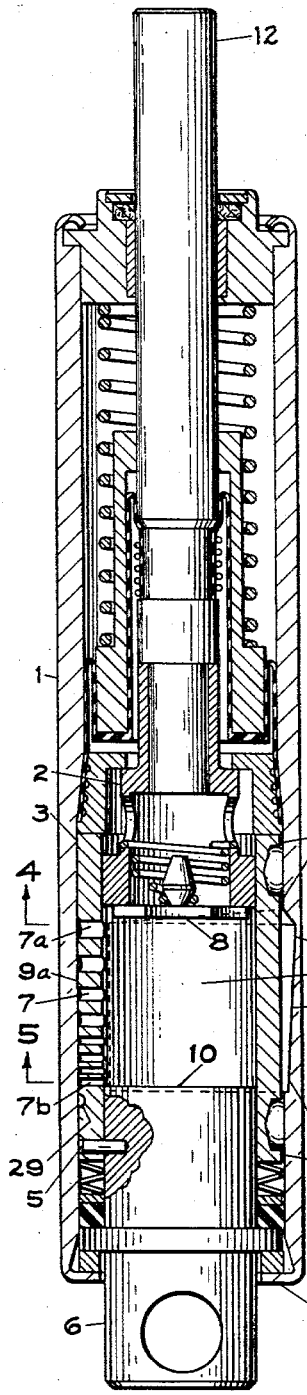

April 6, 1965 R. E. DESCHNER 3,176,972
HYDRAULIC CONTROL DEVICES
Filed Sept. 23, 1963

INVENTOR.
Richard E. Deschner

United States Patent Office 3,176,972
Patented Apr. 6, 1965

3,176,972
HYDRAULIC CONTROL DEVICES
Richard E. Deschner, 5550 Harcross Drive,
Los Angeles, Calif.
Filed Sept. 23, 1963, Ser. No. 310,570
5 Claims. (Cl. 267—1)

This invention relates to improvements in reciprocative adjustable hydraulic control devices of the type having a cylinder with one or more fluid escape apertures extending through its wall, the cylinder containing a piston and being fitted within a tubular housing to regulate fluid flow through the said apertures.

As described in Patent No. 3,027,152, such devices are commonly used to absorb impact from moving mechanical devices which must be repeatedly brought to a gentle stop, and they are also used to control the speed of movement of mechanisms operated manually, pneumatically, by gravity, or by springs.

It is a primary object of this invention to provide means whereby the resistance to motion exerted by an adjustable impact absorber, is less in the earlier portion of its stroke in proportion to the resistance near the end of its stroke than has heretofore been shown to be possible, the advantage of this variation in resistance to motion being to produce quieter and smoother deceleration of moving bodies.

It is another important object to increase the maximum impact absorption capacity of adjustable impact absorbers relative to their intrinsic size.

It is still another important object to increase the range of adjustment between maximum and minimum load conditions for individual hydraulic control devices.

Other objects and advantages will be apparent from the following detailed description of preferred embodiments of the invention. All improvements described herein have been reduced to practice and are presently in commercial use.

Figure 2:
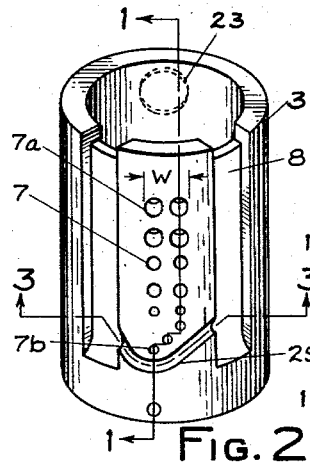
Figure 3:
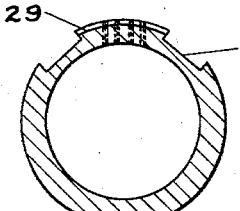
Figure 4:
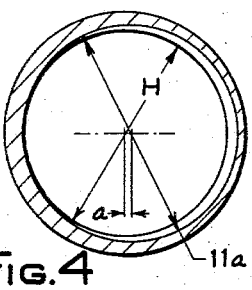
Figure 5:
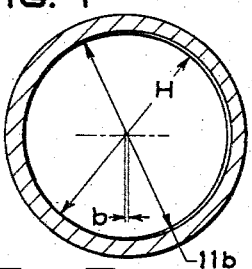
Figure 6:
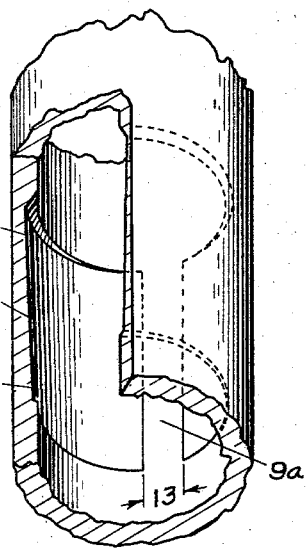
Figure 7:
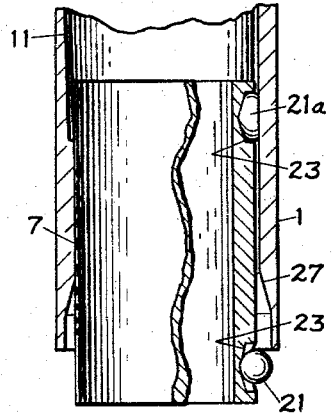

In the drawings,

FIG. 1 is a substantially mid-sectional view taken on zig-zag line 1—1 of FIG. 2 looking in the direction of the arrows and showing a hydraulic control unit embodying this invention, the slidable plunger being shown in its normally extended position, at the start of a working stroke, FIG. 2 is a perspective view of the cylinder of FIG. 1 rotated to show the apertures clearly, FIG. 3 is a transverse section on zig-zag line 3—3 of FIG. 2, FIG. 4 is a transverse section of the housing taken on line 4—4 of FIG. 1, FIG. 5 is a transverse section of the housing taken on line 5—5 of FIG. 1, FIG. 6 is a fragmentary perspective view of the housing of FIG. 1 rotated to show the control surface to advantage, FIG. 7 is a fragmentary sectional view of a portion of the housing and cylinder of FIG. 1, the housing being rotated to show its position during assembly of the cylinder.

The drawings illustrate six different improvements which when properly constructed attain the foregoing objects. When incorporated into impact absorber units as described herein, these improvements not only greatly increase the impact absorption capacity, but also standardize and conform the performance of individual units which are similarly constructed.

Description

FIG. 1 shows the hydraulic control device constructed as impact absorber. It is similar to the FIG. 8 unit of Patent No. 3,027,152 in that it comprises a hoousing 1 containing a piston 2 slidable within a cylinder 3, said cylinder containing fluid 4 and being rotatable within the housing for load adjustment by means of a pin 5 keying the cylinder to external knob 6. The cylinder has a series of apertures 7 located along its length extending through the cylinder wall. In the following explanation and in the claims, the "start stroke" position of the piston will be taken to mean that position in which the piston is shown in FIG. 1; the "end stroke" position of the piston will be taken to mean that position where only aperture 7b remains open to flow below the piston. The "low pressure end of the cylinder" will mean the upper end of the cylinder as illustrated in FIGS. 1 and 2. The housing 1 is provided with a free-fitting cylindrical bore 9 surrounding the ends of the cylinder and forming a bearing for the same, and a circuitous eccentric control surface 11 surrounding a portion of the cylinder and located for selective registry with the apertures when the cylinder is rotated. As explained in Patent No. 3,027,152, rotation of the cylinder causes the apertures to approach or recede from the eccentric control surface to provide a valving action which variably restricts the fluid flow through said apertures. Rotation of the cylinder thereby adjusts the capacity of the impact absorber to absorb kinetic energy in greater or lesser amounts to suit the weight and speed of the body striking the end of plunger 12. Patent No. 3,027,152 describes the eccentric control surface in the housing as being substantially cylindrical with its axis parallel to the axis of the housing. The radial spacing of such an eccentric is substantially the same from all of the individual apertures at any certain rotational position of the cylinder.

It has been shown by tests that the quietest action is given by an impact absorber when the greatest variation in resistance to movement is effected during the stroke of the piston, because then the striking blow of the moving body against the plunger can be relatively light. Other tests have shown that in stopping moving loads actuated by pneumatic cylinders, the impact absorber with the greatest variation in resistance to movement gives the smoothest stop to the load. This is due to the fact that pneumatically actuated loads are usually over-powered and start moving under influence of an air pressure in the pneumatic cylinder which is considerably below the line pressure of the air feed line. When such a load first hits an impact absorber which has too little variation in resistance, the initial resistance is excessive, and causes the pneumatically actuated load to hesitate momentarily at the beginning of the impact absorber stroke until air pressure in the pneumatic cylinder builds up, then the load surges forward to its final stopping position. This "double stopping" wastes time and produces an objectionable action of the impact absorber.

*Improvements in apertures and in shape of control surface*

The present invention enhances the aforementioned quiet action and overcomes the said "double stopping" by providing four improvements illustrated in FIGS. 1–6. The first of these comprises provison of a large number of apertures 7 which are arranged in plural rows and graduated in size, those adjacent the "start stroke" position of the piston at 7a being greater in diameter than those adjacent the "end stroke" position at 7b. The second improvement comprises a tapered shape for control surface 11, the third and fourth have to do with making the control surface 11 with a circumferential extent of less than 360°, the discontinuity in the same being occupied by a portion of the housing bore at 9a wide enough to seal all apertures simultaneously for maximum load conditions. As will now be explained in detail, these improvements produce an unusually large variation in the resistance to motion exerted by the impact absorber during its working stroke.

It is obvious that a large enough number of apertures will permit ample fluid flow from the cylinder to insure minimum resistance at the beginning of the impact absorber stroke. If the apertures are graduated in size as in FIGS. 1 and 2, then the *aperture area ratio* between the "start stroke" and "end stroke" positions of the piston would=(total area of all apertures)÷(area of last aperture 7b). However, flow through the apertures is restricted not by the aperture area but by the proximity of control surface 11. If we let $D$=diameter of any certain aperture and $d$=distance of the control surface from the said aperture, the aperture area will of course be $(3.1416 \times D^2 \div 4)$ but the flow restrictive area will be $(3.1416 \times D \times d)$ which is seen to be the product of the aperture mouth circumference and its distance from the control surface. For efficient control, the distance "$d$" should never exceed $\frac{1}{4}D$ since then the flow restrictive area $(3.1416 \times D \times d)$ is the same as the aperture area. If this latter requirement is complied with, and the control surface is tapered at all points to give it spacing substantially proportional to the various aperture diameters at all rotational positions of the cylinder, it will give graduated restriction of the apertures at all rotational positions of the cylinder. Then the *flow restriction ratio* between the "start stroke" and "end stroke" positions of the piston will remain substantially constant for different load adjustments and will=(total circumference of all apertures)÷(circumference of last aperture 7b).

The third improvement comprising provision of the discontinuity in the control surface 11, makes possible the use of many apertures as described, because they can be arranged in circumferentially spaced rows, the housing bore surface at 9a being made wide enough at dimension 13 to exceed the overall aperture width W so all apertures can face the discontinuity simultaneously for maximum shut-off.

To explain the fourth improvement it will be assumed that the tapered control surface is circular as shown in FIGS. 4–5. It is therefore conical and has a central axis. To attain the aforementioned graduated restriction of apertures at all rotary positions of the cylinder, the intersections of the control surface 11 with the housing bore must be approximately parallel to the axis of the housing as shown at dimension 13 in FIG. 6, so that as nearly as possible, all apertures reach their shut-off position simultaneously as the cylinder is rotated for adjustment. To accomplish this, the fourth improvement comprises constructing the conical control surface with its axis canted with respect to the axis of the housing, so that the offset "$a$" FIG. 4 between the centerlines of diameter H of the housing bore and the diameter at 11a of the control surface is greater than offset "$b$" FIG. 5 between the centerlines of diameter H and the diameter at 11b of the control surface by an amount substantially equal to half the difference between the diameters of 11a and 11b.

There is a practical limit to how small apertures can be drilled. For example in the manufacture of 1" stroke impact absorbers with .625" bore cylinders, an .031" diameter aperture is about as small as can be drilled in a tough metal cylinder with average labor and equipment without excessive drill breakage. Accordingly, from the third preceding paragraph, the practical maximum value of the *flow restriction ratio* which could be had in the 1" stroke impact absorber by drilling the apertures as shown in FIG. 2, using .064" diameter for 7a, .047" diameter for 7, and .032" diameter for 7b, would seem to be (19/1). However, although this ratio would be adequate for many purposes, it can be increased to make the impact absorber more versatile by constructing the aforementioned tapered shape of the control surface to have a maximum spacing of, for example, .016" (¼ the diameter of aperture) at aperture 7a, with only .004" (⅛ the diameter of aperture) maximum at aperture 7b. Then the *flow restriction ratio* between "start stroke" and "end stroke" positions of the piston will=$(19 \times \frac{1}{4} \div \frac{1}{8} = 38/1)$.

Aperture shut-off

During the most heavily loaded working stroke of the impact absorber, the apertures will be positioned at or near the surface 9a. When at 9a, close interfacial contact between apertures and housing bore to resist flow through the apertures is necessary for maximum energy absorption. When the apertures are not exactly at 9a but are near it, accurate spacing of the apertures from the shallow contour of the control surface is necessary to maintain the *flow restriction ratio* previously explained. Deterrent to close contact and accurate spacing, however, is the high pressure fluid forced from the apertures into the interstice between cylinder and housing because it separates the surfaces of the cylinder and housing at this point and makes way for greater flow than could otherwise occur.

Separation of the surfaces as described, is augmented by two disadvantages. First, the use of interchangeable parts for economical manufacture gives varying clearances between housing and cylinder of from .001" to .003", permitting separation; second, the use of a thin-walled housing for miniaturization externally of the cylinder redounds in elasticity of the housing, so that the housing can be deflected to a slightly oval shape by the aforementioned high pressure fluid to permit additional separation.

Improvement in fit of cylinder and housing

To overcome the two disadvantages mentioned, and to increase as much as possible the maximum impact absorption capacity, and the range of adjustment between maximum and minimum load conditions, the present invention provides as a fifth improvement, pressure members 21a such as are shown in FIG. 7. These are held in concavities 23 formed in the cylinder wall approximately 180° from the apertures 7 and are preferably deformable as will be explained.

As illustrated in FIG. 1 and in Patent No. 3,027,152, the housing may be swaged at 25 to retain its internal components. In FIG. 7, the housing shape before final assembly is preferably made to include a chamfer 27, so that deformable pressure members which are originally shaped as indicated at 21, may be rotationally positioned away from surface 11 and forced into the housing during assembly to be automatically deformed to the shape shown at 21a. Deformable pressure members are preferably made of lead or lead-tin alloy because these are adequate bearing materials and deformable, yet they are resistive enough to maintain after assembly a constant contact pressure against the housing, causing positive contact pressure between the aperture side of the cylinder and the housing. If housing 1 is sufficiently elastic, it insures that the contact pressure will be maintained permanently even though the pressure members might wear slightly after repeated adjustments of the cylinder. Pressure members consisting of beads of soft solder adhered to the outer surface of the cylinder perform satisfactorily also.

The pressure members, in maintaining a tight fit of the cylinder against the housing, result in increased torque required for rotating the cylinder. Shown in FIGS. 2–3 is a sixth improvement which keeps the torque moderate by reducing the amount of pressure required from the pressure members. The improvement comprises a depressed area 29 provided in the outer surface of the cylinder immediately adjacent to the last apertures at the "end stroke" position of the piston. The said depression carries away any high pressure fluid that leaks into it from the apertures, and thereby frees all that area of the cylinder which is below the apertures from the separating action of the high pressure fluid.

It should be understood that the present disclosure is for the purpose of illustration only, and that this invention includes all modifications and equivalents which come within the scope of the subject matter claimed.

What is claimed is:

1. In an adjustable hydraulic control device having a housing with a bore containing fluid and a cylinder with a slidable piston, said piston forming part of a reciprocative plunger adapted to resist movement of bodies in motion, said cylinder having an outer surface and an axis and a wall with axially and circumferentially spaced apertures therethrough to permit fluid flow, said cylinder having a low pressure end and at least one axially extending escape groove in its outer surface through which fluid flowing from the apertures returns to the low pressure end of the cylinder, said cylinder being rotatable within said housing to regulate flow of fluid through said apertures, said piston having "start stroke" and "end stroke" positions between which said piston travels when making a working stroke; the combination of a control surface provided within said housing extending circumferentially part way around a portion of the outer surface of the cylinder in which the apertures are disposed, said control surface having axially spaced boundaries and having clearance from the outer surface of the cylinder, said clearance varying circumferentially from point to point, the average amount of said clearance being greater adjacent the "start stroke" position of the piston than adjacent the "end stroke" position, said control surface having a substantially conical shape, its axis being canted relative to the axis of the housing bore in a direction tending to conform the circumferential extents of its axially spaced boundaries, the circumferential extent of at least a portion of said control surface being less than 360° and being completed to full circle by an extent of the housing bore, pressure means between said housing and said cylinder urging a portion of the cylinder adjacent the apertures into positive contact with the housing bore, and torque moderating means for the cylinder comprising a depressed area in the outer surface of the cylinder immediately adjacent to the last aperture at the "end stroke" position of the piston and spaced therefrom in a direction axial to the cylinder and away from the other apertures, said depressed area being connected to said axially extending escape groove to carry away any high pressure fluid that leaks into it from the apertures.

2. In an adjustable hydraulic control device having a housing with a bore containing fluid and a cylinder with a slidable piston, said piston forming part of a reciprocative plunger adapted to resist movement of bodies in motion, said cylinder having an outer surface and an axis and a wall with axially spaced apertures therethrough to permit fluid flow, said cylinder being rotatable within said housing to regulate flow of fluid through said apertures, said piston having "start stroke" and "end stroke" positions between which said piston travels when making a working stroke; a control surface within said housing extending circumferentially at least part way around a portion of the outer surface of the cylinder in which the apertures are disposed, said control surface having clearance from the outer surface of the cylinder, said clearance varying from point to point in a circumferential direction, the average amount of said clearance being greater adjacent the "start stroke" position of the piston than adjacent the "end stroke" position, and said control surface having a substantially conical shape, its axis being canted relative to the axis of the housing bore.

3. In an adjustable hydraulic control device having a housing with a bore containing fluid and a cylinder with a slidable piston, said piston forming part of a reciprocative plunger adapted to resist movement of bodies in motion, said cylinder having an outer surface and an axis and a wall with apertures therethrough to permit fluid flow, said cylinder being rotatable within said housing, the piston having "start stroke" and "end stroke" positions between which said piston travels when making a working stroke; the combination of a control surface provided within said housing extending circumferentially around a portion of the outer surface of the cylinder through which the apertures are disposed, said control surface being shaped to restrict the flow of fluid through the apertures, the amount of restriction being dependent upon the rotary position of the cylinder, and pressure means urging a portion of the cylinder adjacent the apertures toward the control surface in at least one position of the cylinder, said pressure means comprising a yieldable pressure member retained in a concavity provided in the cylinder wall.

4. In a hydraulic control device having a housing with a bore containing fluid and a cylinder with a slidable piston, said piston forming a part of a reciprocative plunger adapted to resist movement of bodies in motion, said cylinder having an outer surface and an axis and a wall with apertures therethrough to permit fluid flow, the piston having "start stroke" and "end stroke" positions between which said piston travels when making a working stroke; the combination of a control surface provided within the housing adjacent the outer surface of the cylinder, said control surface being shaped to restrict the flow of fluid through the apertures, and pressure means urging a portion of the cylinder adjacent the apertures toward the control surface, said pressure means comprising a pressure member retained between the cylinder and the housing.

5. In an adjustable hydraulic control device having a housing with a bore containing fluid and a cylinder with a slidable piston, the piston forming part of a reciprocative plunger adapted to resist movement of bodies in motion, the cylinder having an outer surface and an axis and a wall with axially spaced apertures therethrough with mouths at said outer surface, said piston having "start stroke" and "end stroke" positions between which it travels while making a working stroke; a control surface within the housing extending at least part way around a portion of the outer surface of the cylinder, said control surface being canted relatively to the cylinder axis and varying in its angle of cant circumferentially to said outer surface, the cylinder being rotatable within the housing to bring said aperture mouths into close proximity to the control surface to create flow restrictive areas bounded by the control surface and the circumferences of said mouths, individual apertures adjacent the "end stroke" position having smaller flow restrictive areas relative to their cross sectional areas than individual apertures adjacent the "start stroke" position.

References Cited by the Examiner

UNITED STATES PATENTS

| 1,584,884 | 5/26 | Merrick | 188—96.6 |
| 1,821,787 | 9/31 | Black | 267—64 X |
| 2,628,692 | 2/53 | Hufferd | 188—88.502 X |
| 2,846,029 | 8/58 | Cawley | 188—88.53 X |
| 3,027,152 | 3/62 | Deschner | 267—1 |

ARTHUR L. LA POINT, *Primary Examiner.*